United States Patent [19]
Tatsuta

[11] Patent Number: 5,692,113
[45] Date of Patent: Nov. 25, 1997

[54] DATA REPRODUCTION SYSTEM FOR REPRODUCING AND OUTPUTTING MULTIMEDIA INFORMATION USING A PRINTER

[75] Inventor: Seiji Tatsuta, Hachioji, Japan

[73] Assignee: Olympus Optical Co., Ltd., Tokyo, Japan

[21] Appl. No.: 645,776

[22] Filed: May 14, 1996

[30] Foreign Application Priority Data

May 17, 1995 [JP] Japan .................................. 7-118492

[51] Int. Cl.$^6$ ................................................. G06K 15/00
[52] U.S. Cl. ............................................ 395/117; 395/106
[58] Field of Search ................................. 395/117, 101, 395/106, 224, 112, 615–616, 765, 766, 767, 768, 772, 786, 802, 806, 807, 135, 2.44, 2.4, 892, 893, 2.55–2.58; 382/182–184, 309–311; 400/73; 369/50; 358/473; 399/144

[56] References Cited

U.S. PATENT DOCUMENTS

4,138,719  2/1979  Swanstrom et al. ..................... 395/117
5,613,057  3/1997  Caravel ................................... 395/806

Primary Examiner—Arthur G. Evans
Attorney, Agent, or Firm—Frishauf, Holtz, Goodman, Langer & Chick

[57] ABSTRACT

In the data identification device in the data reproduction device, contents of decoded data for respective sub-sets are identified by the dot reader. Based upon the identification result, the printer controller controls the printer and then data is printed out. The printer controller stores, in advance, suitable printing methods depending on identification results of the data identification device. If a certain identification result is inputted, the control information generation device outputs printer control information in accordance with the corresponding printing method,. and the data process device processes and outputs data.

6 Claims, 5 Drawing Sheets

OUTPUT DIVIDED PARTS
OF IMAGE TO PRINTER

DATA REPRODUCTION SYSTEM FOR REPRODUCING AND OUTPUTTING MULTIMEDIA INFORMATION USING A PRINTER

BACKGROUND OF THE INVENTION

1. Field of the Invention

The present invention relates to a data reproduction system which optically reads codes recorded in an optically readable manner on a recording medium, e.g. paper, thereby reproducing so-called multimedia information including audio information such as voice and sound, video information obtained from cameras and video equipment, and digital code data obtained from personal computers and word processors.

2. Description of the Related Art

Various media for recording, e.g. voice and music are known, such as magnetic tapes, optical discs and the like. These media, however, are somewhat expensive though their copies can be mass-produced, and a large space is required to store them. Moreover, time and labor are required to deliver a medium to a distant place, whether by mail or directly. These problems are inherent in multimedia which have not only audio information but also video information obtained from cameras and video equipment, and digital code data obtained from personal computers and word processors.

To solve the problems, a system is disclosed in the European Patent Publication No. EP 0,670,555 A1 corresponding to U.S. patent application Ser. No. 08/407,018. The system can transmit, by facsimile, multi-media information which includes at least one of audio information, image information and digital code data, also can record image information which can be copied at low cost in great quantities, i.e. encoded information, on a recording medium (such as paper) in the form of a two-dimensional code pattern consisting of a plurality of dots, and can reproduce the multi-media information.

Also, a PCT Patent Publication PCT/JP95/01050 filed by the same applicant as that of the present invention and corresponding to the U.S. patent application Ser. No. 08/407,018 discloses a multimedia paper (MMP) system. The system records and reproduces multimedia information as optically readable dot codes on an information recording medium, e.g. paper. The system consists of a plurality of logical hierarchal structures having one to five layers for recording and reproduction, respectively, which are used as hierarchal divisions by means of information transfer protocol. According to this related application, data is divided into groups each of which can be identified as an information unit, e.g. an information unit for sound only, an information unit for pictures only and a picture information-sound information combined unit. Each group of data is defined as "a sub-set". The "sub-set" means a group of information capable of being converted into information which can be identified as data by itself by persons without the formation of a file.

In the systems disclosed in EP 0,670,555 A1 and PCT/JP95/01050, video information or digital code data is outputted as images or texts to a monitor, audio information is outputted as sound to a speaker or ear-phones or digital code data is outputted to a printer.

However, in these systems, consideration has not been given to outputting to the printer, reproduction data of video information or audio information contents of which are difficult to express on the printer.

SUMMARY OF THE INVENTION

The present invention has been made under these circumstances. Its object is to provide a data reproduction system which optically reads codes from a recording medium, e.g. paper wherein so-called multimedia information including audio information such as voice and sound, video information obtained from cameras and video equipment, and digital code data obtained from personal computers and word processors has been recorded as the optically readable codes, and which reproduces the original multimedia information, the data reproduction system of the present invention making it possible to express reproduction data contents of which are difficult to express on a printer.

According to the present invention, there is provided a data reproduction system comprising:

a reader for optically reading a code with a predetermined format recorded in an optically readable manner on a data recording medium, and for decoding the code for respective sub-sets, multimedia information which includes at least one of voice information, image information and text information being coded, with a predetermined method, into the data, serving as the codes, in units of sub-sets in the data recording medium, the sub-sets being groups of data each of which can be identified as an information unit; and a data reproduction device for reproducing and outputting the data decoded by the reader, wherein the data reproduction device includes:

a data identification device for identifying contents of data for the respective sub-sets, decoded by the reader;

a printer controller for controlling a printer based on an identification result of the data identification device; and the printer, controlled by the printer controller, for printing out the data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodi-ments given below, serve to explain the principles of the invention.

DETAILED DESCRIPTION OF THE PREFERRED EMBODIMENTS

The embodiments of the present invention will now be explained with reference to the appended drawings.

Figure 1A:
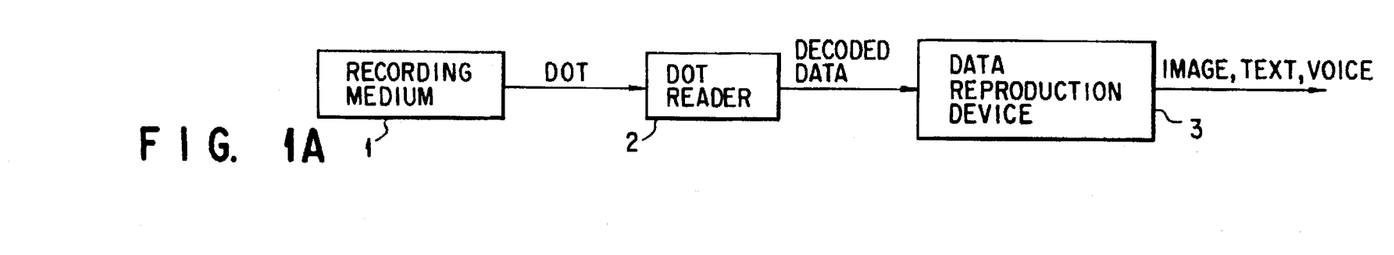
FIG. 1A is a block diagram of the data reproduction system according to the first embodiment of the present invention.

FIG. 1A is a block diagram of the data reproduction system according to the first embodiment of the present invention. The system consists of a pen-shaped dot reader 2, manually operated by a user (an operator), for scanning a dot code (not shown) recorded on a recording medium 1 such as a sheet; and a data reproduction device 3 for converting decoded data outputted from the dot reader 2 into original multimedia information, such as voice and images, and for outputting the multimedia information.

The detailed explanations of the dot code and the dot reader, which have been already given in the EP 0,670,555 A1, are not given here.

Figure 1B:
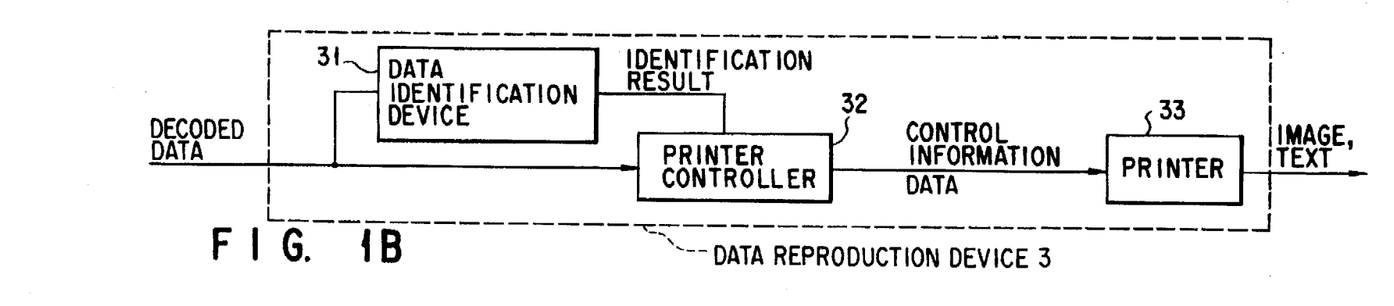
FIG. 1B is a block diagram of the data reproduction device of FIG. 1A.

As shown in FIG. 1B, the data reproduction device 3 consists of a data identification device 31 for identifying kinds of decoded data from the dot reader 2; a printer controller 32 for controlling a printer 33 in accordance with identification results done by the data identification device 31; and the printer 33, controlled by the printer controller 32, for printing out data fed from the printer controller 32.

Figure 1C:
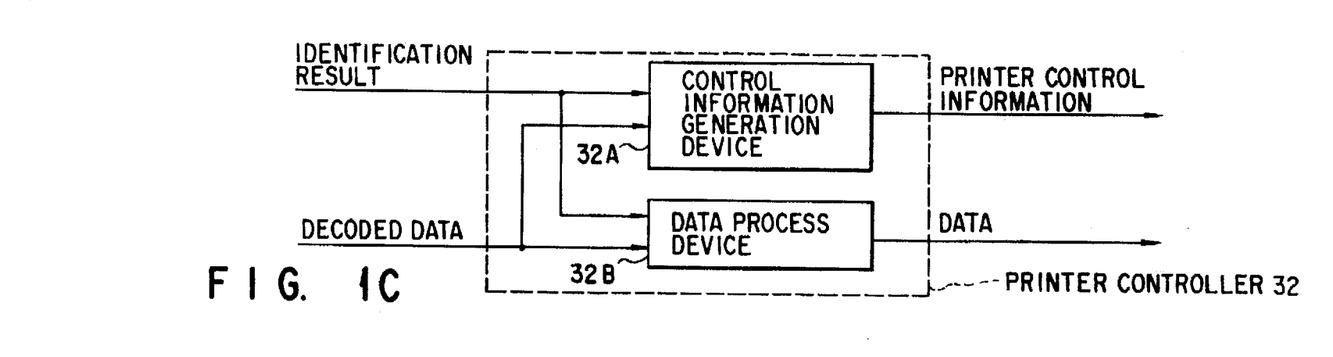
FIG. 1C is a block diagram of the printer controller of FIG. 1B.

As shown in FIG. 1C, the printer controller 32 stores, in advance, suitable printing methods in accordance with the identification results of the data identification device 31. If a certain identification result is inputted, then based upon the corresponding printing method, a control information generation device 32A outputs printer control information and a data processing device 32B processes and outputs data.

Next, operations in this structure will be explained.

Figure 2A:
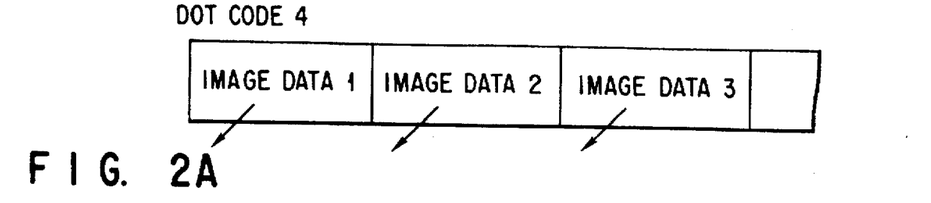
FIG. 2A is a view showing a dot code including a plurality of image sub-sets.
Figure 2B:
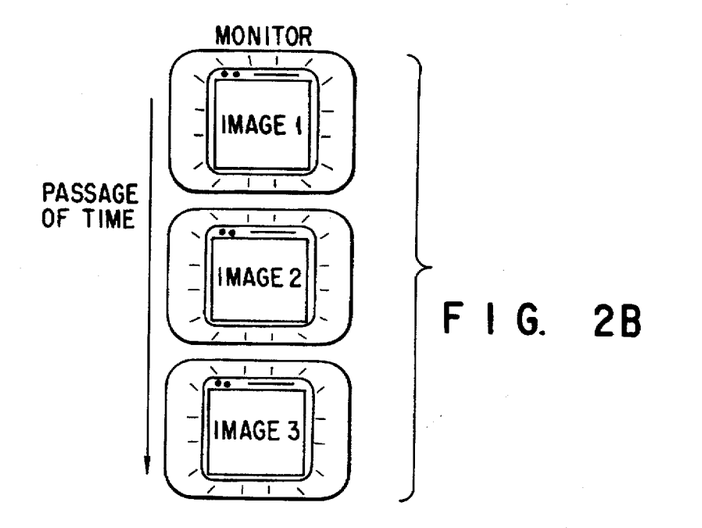
FIG. 2B is a view showing how the dot code of FIG. 2A is outputted to the monitor.

For example, as shown in FIG. 2A, if a dot code 4 consists of a plurality of sub-sets for image data (i.e. Image Data 1, Image Data 2 and Image Data 3), it is read by the dot code reader 2. As shown in FIG. 2B, when outputted by an ordinary monitor, the sub-sets of the dot code are switched with the passage of time.

Figure 2C:
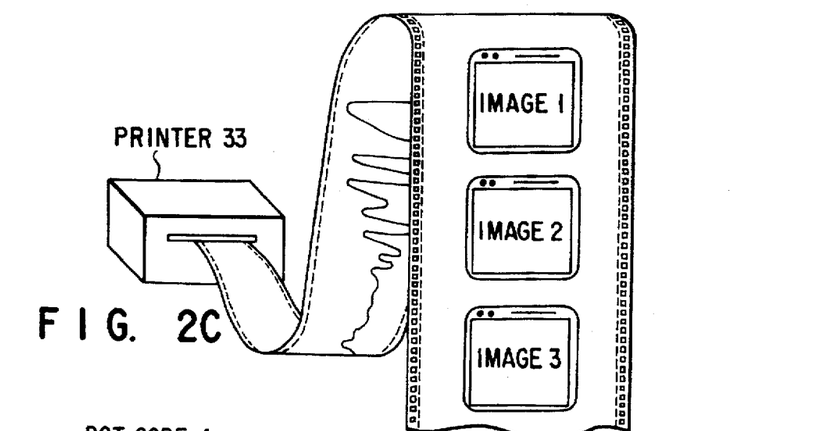
FIG. 2C is a view showing how the dot code of FIG. 2A is outputted to the printer.

As shown in FIG. 2C, to allow data which varies with the time to be expressed on the printer 33, the scroll of the printing paper is controlled and information corresponding to the passage of time in terms of texts and images on the monitor is thereby expressed.

For example, the dot code 4 is scanned on the recording medium 1 in a designated order. If a code for displaying images like slides is used and the printer 33 is set as the data reproduction device 3, then the data identification device 31 identifies the data and the printer controller 32 supplies printer control information, with which frames of images are printed consecutively, and the data to the printer 33.

If the dot code 4 in which consecutive data is recorded is scanned, the printer controller 32 controls the printer such that a graph having a time axis in the scroll direction is printed.

Figure 3A:
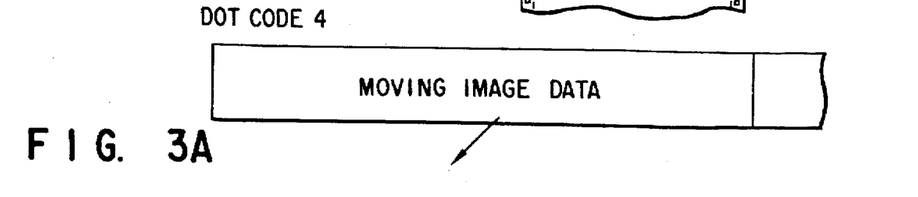
FIG. 3A is a view showing a dot code including sub-sets for moving images.

Also, as shown in FIG. 3A, if the dot code 4 consists of sub-sets for moving image data (Moving Image Data), it is read by the dot code reader 2. When using an ordinary monitor, moving images are outputted as shown in the upper part of FIG. 3B.

Figure 3B:
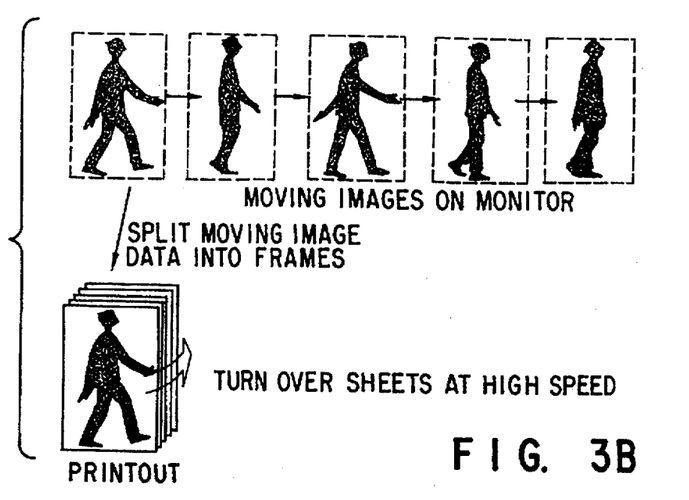
FIG. 3B is a view showing moving images displayed on the monitor corresponding to the dot code of FIG. 3A and printout results thereof.
Figure 3C:
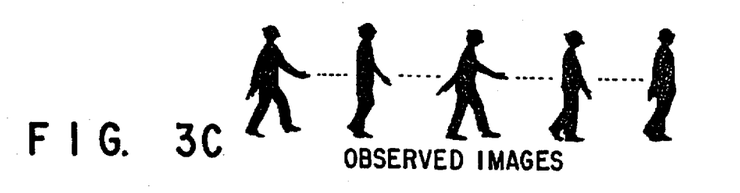
FIG. 3C is a view showing images observed by turning over the printed results at high speed shown at the lower part of FIG. 3B.

To express moving image data on the printer 33, the moving image data is split into units of frames and the frames are printed on different printing sheets in the same position as one another as shown in the lower part of FIG. 3B. The sheets are turned over at high speed, thereby making it possible to express the moving image data on the printer as shown in FIG. 3C.

For example, if the dot code 4 is scanned on the recording medium 1 in which moving image data is recorded, the data identification device 31 identifies the moving image data. Then the printer controller 32 supplies printer control information and the data so that images are printed on different printing sheets in the same position as one another. The sheets on which images are printed out by the printer 33 are turned over one after another, thereby making it possible to express the moving image data while utilizing afterimages.

Figure 4A:
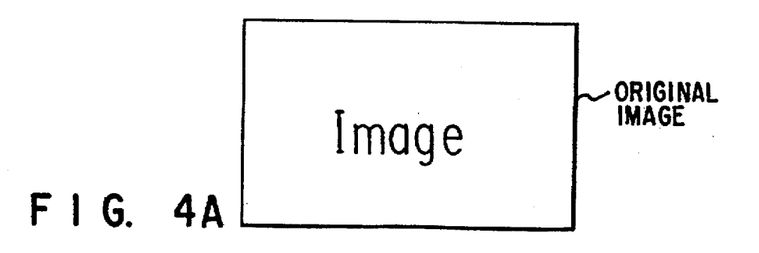
FIG. 4A is a view showing a large-size original image.

Also, if a large image or a highly fine image as shown in FIG. 4A is outputted using a monitor, there are cases where display methods are limited due to the limitations of the size of the monitor and the resolution. The present invention allows a large image or a highly fine image, which is usually difficult to express on the monitor, to be expressed on the printer.

Figure 4B:
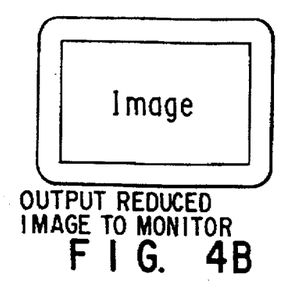
FIGS. 4B and 4C are views showing the image of FIG. 4A displayed on monitors by respective display methods.
Figure 4C:
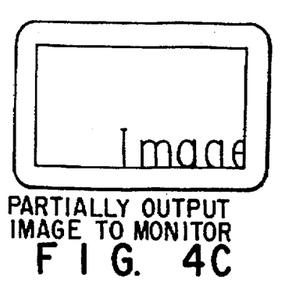
Figure 4D:
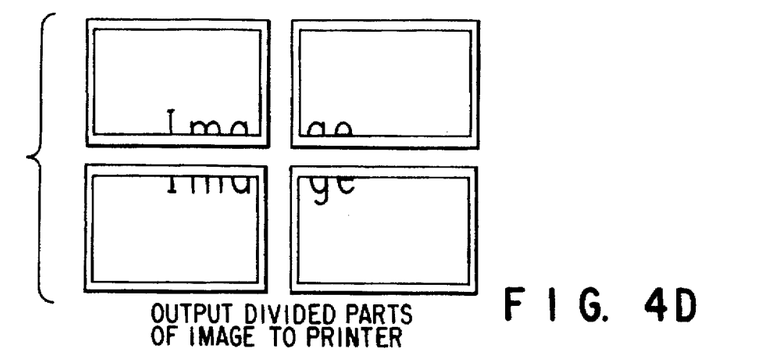
FIG. 4D is a view showing output states of the image of FIG. 4A on the printer.

That is, in order to display a highly fine image on a monitor, the image needs to be reduced in size as shown in FIG. 4B or to be partly displayed as shown in FIG. 4C. This highly fine image is divided into areas each of which can be printed by the printer 33 as shown in FIG. 4D. The divided image areas are printed and expressed like a multi-screen.

For example, the dot code 4 is scanned on the recording medium 1 in a designated order. If a code for displaying large or highly fine images is used and the printer 33 is set as a reproduction device, then the data identification device 31 identifies the data and the printer controller 32 supplies printer control information with which divided images like a multi-screen can be printed in due order and the data, to the printer 33.

The second embodiment of the present invention will now be explained. The first embodiment mentioned above relates to the output of image information or digital code data to the printer, whereas the second embodiment relates to the output of audio data to the printer.

Figure 5:
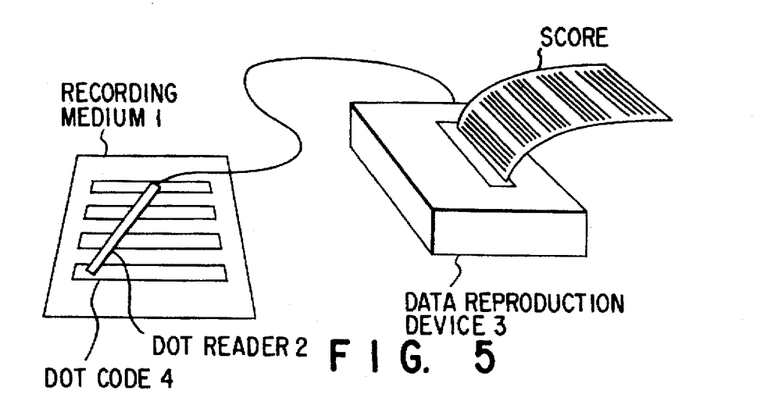
FIG. 5 is a view showing output states of MIDI data in the printer in the data reproduction system according to the second embodiment of the present invention.

For example, if MIDI (Musical Instrument Digital Interface) data which cannot be played by the printer is obtained as decoded data, it is possible to output the MIDI data as a score as shown in FIG. 5.

Figure 6:
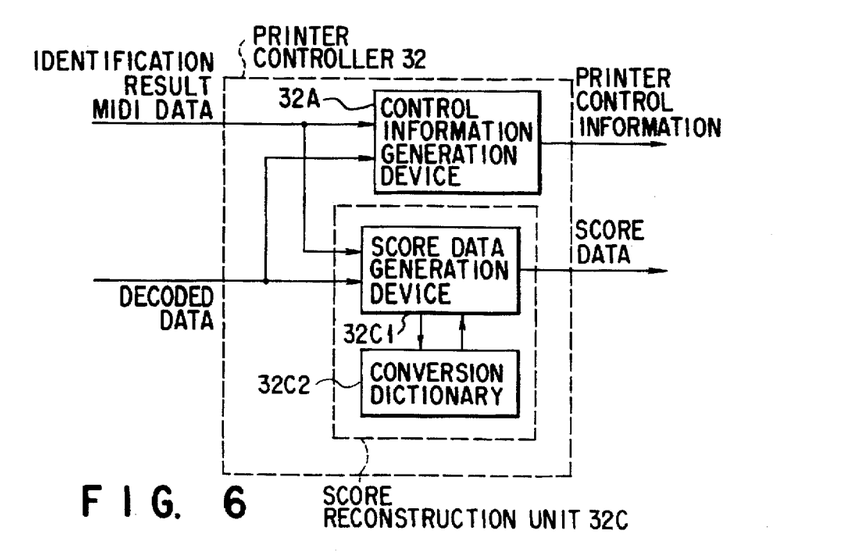
FIG. 6 is a block diagram showing the structure of a printer controller when MIDI data is printed out.

To carry out this operation, the printer controller 32 is constructed as shown in FIG. 6. Specifically, in this embodiment, the data process device 32B of FIG. 1 is replaced with a score reconstruction unit 32C. The score reconstruction unit 32C has a score data generation device 32C1 which converts the decoded data into score data while referring to a conversion dictionary 32C2 indicating the relationship between the MIDI data and notes.

To be more specific, in case of scanning the dot code 4 in which MIDI data is recorded, the control information generation device 32A generates and feeds printer control information to the printer 33. The score data generation device 32C1 expands MIDI data to respective sub-sets, generates score data while referring to the conversion dictionary 32C2 and feeds the score data to the printer 33 to thereby print out the score data as a score.

Figure 7A:
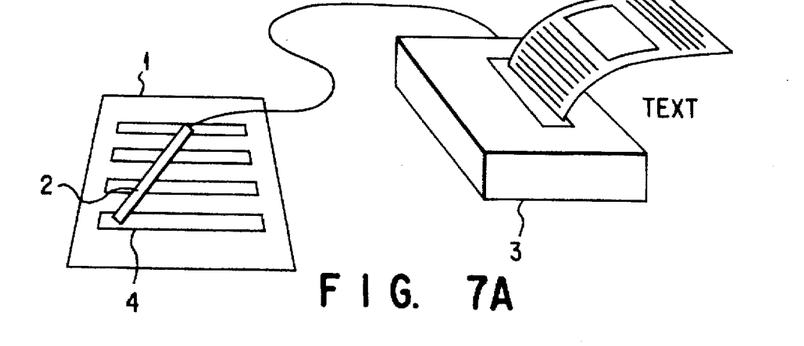
FIG. 7A is a view showing output states of voice data on the printer according to the second embodiment of the present invention.
Figure 7B:
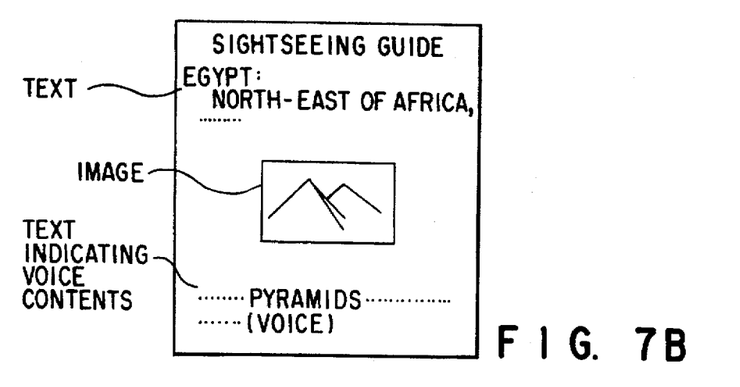
FIG. 7B is a view showing printout results of the voice data.

Also, if voice data which cannot be expressed by the printer is obtained as decoded data, it is possible to output the voice data as a text 5 as shown in FIGS. 7A and 7B.

Figure 8:
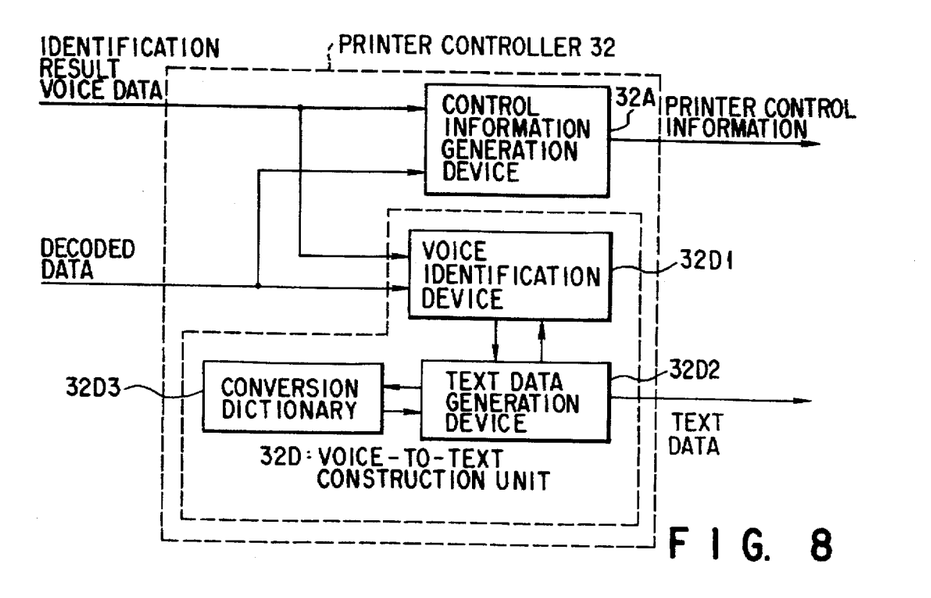
FIG. 8 is a block diagram showing the structure of the printer controller when the voice data is printed out.

To carry our this operation, the printer controller 32 is constructed as shown in FIG. 8. Specifically, the data process device 32B of FIG. 1C is replaced with a voice-to-text construction unit 32D. The unit 32D includes a voice identification device 32D1 for identifying voice from decoded data and a text data generation device 32D2 for converting the voice identification result into text data while referring to the conversion dictionary 32D3.

Namely, if a dot code 4 in which voice data is recorded is scanned, the control information generation device 32A generates and feeds printer control information to the printer 33. The voice identification device 32D1 carries out identification process by expanding voice data to respective sub-sets. The text data generation device 32D2 generates text data while referring to the conversion dictionary 32D3 and feeds the text data to the printer 33, thereby making it possible to print out voice as a text 5.

Furthermore, if a voice synthesis method is applied to voice reproduction, voice synthesis data can be directly converted into a text.

Explanations have been given so far to the present invention based on the embodiments. However, the present invention is not restricted to the above-mentioned embodiments and can be modified or applied within the range of the subject matter of the present invention. In the meantime, the subject matter thereof will be outlined as follows.

(1) A data reproduction system characterized by comprising:

a reader (2) for optically reading a code (4) with a predetermined format recorded in an optically readable manner on a data recording medium (1), and for decoding the code for respective sub-sets, multimedia information which includes at least one of voice information, image information and text information being coded, with a predetermined method, into the data, serving as the code, in units of sub-sets in the data recording medium, the sub-sets being groups of data each of which can be identified as an information unit; and a data reproduction device (3) for reproducing and outputting the data decoded by the reader (2), wherein the data reproduction device (3) includes:

a data identification device (31) for identifying contents of data for the sub-sets, respectively, decoded by the reader (2);

a printer controller (32) for controlling a printer (33) based on the identification result of the data identification device (31); and the printer (33), controlled by the printer controller (32), for printing out the data.

Namely, since it is possible to select as the data reproduction device a printer other than a monitor or a speaker, the data reproduction system of the present invention can be applied to the variety of reproduction data and can thus provide improved versatility. In addition, a single code includes sub-sets of data which have been recorded on the assumption that they are reproduced by different reproduction devices, such as a monitor or a speaker. The data reproduction system of the present invention identifies the data in units of sub-sets and converts the data into forms which can be expressed on the printer, so that the power of expression can be improved.

(2) The data reproduction system according to above (1), characterized in that the printer controller (32) has scroll control means (32A) for, if the sub-set identification result of the data identification device (31) indicates sequential data, controlling the scroll of printing paper in accordance with the course of a change in data.

Namely, if a printer is selected as the data reproduction device, it is possible to reproduce sequential data which is difficult to express on the printer. Also, since the course of change is printed, it is possible to observe the data which may be overwritten with the passage of time if it is reproduced on the monitor on a sub-set-by-sub-set basis, thereby facilitating comparison.

(3) The data reproduction system according to above (1), characterized in that the printer controller (32) has frame control means (32B) for, if the sub-set identification result of the data identification device (31) indicates moving image data, generating a still image for each frame from the moving image data, and for outputting the still image to the printer (33).

Namely, if a printer is selected as the data reproduction device, it is possible to reproduce pseudo-moving images using the afterimage effect by printing on sheets, frames of moving image data which cannot be expressed by the printer, respectively.

(4) The data reproduction system according to above (1), characterized in that the printer controller (32) has page control means (32B) for, if the sub-set identification result indicates image data exceeding the size which can be printed on a page of the paper, splitting the image data into areas each of which can be printed on a page of the paper, and for outputting the split areas to the printer (33).

Namely, if a printer is selected as the data reproduction device, it is possible to reproduce highly fine image data, which can be expressed on the monitor only if the data is reduced in size or can be partly displayed, in a multi-screen manner, by splitting the data into areas each of which can be printed on a page of the paper.

(5) The data reproduction system according to (1), characterized in that the printer controller (32) has score reconstruction means (32C) for, if the sub-set identification result indicates MIDI data, expanding the MIDI data to a score, and for outputting the score to the printer (33).

Namely, if a printer is selected as the data reproduction device, it is possible to reproduce MIDI code, which cannot be played by the printer, as a score.

(6) The data reproduction system according to (1), characterized in that the printer controller (32) has voice-to-text construction means (32D) for, if the sub-set identification result of the data identification device (31) indicates voice data, identifying and converting the voice data into a text, and for outputting the text to the printer (33).

Namely, if a printer is selected as the data reproduction device, it is possible to reproduce voice data, which cannot be reproduced by the printer, as a text.

(7) A data reproduction device characterized by comprising:

a data identification device (31) for, upon receiving decoded data for sub-sets from a reader (2) for optically reading a code (4) with a predetermined format recorded in an optically readable manner on a data recording medium (1), and for decoding the code (4) for respective sub-sets, multimedia information which includes at least one of voice information, image information and text information being coded, with a predetermined method, into the data, serving as the code, in units of sub-sets in the data recording medium, the sub-sets being groups of data each of which can be identified as an information unit, identifying contents of data for the sub-sets, respectively;

a printer controller (32) for controlling a printer (33) based on the identification result of the data identification device; and the printer (33), controlled by the printer controller (32), for printing out the data.

Namely, since it is possible to output decoded reproduction data to the printer, the data reproduction device of the present invention can be applied to the variety of reproduction data and can, thus, provide improved versatility. Also, a single code includes data which have been recorded on the assumption that the sub-sets thereof are reproduced by different reproduction devices, such as a monitor or a speaker. The data reproduction device of the present invention identifies and converts the data into forms which can be expressed on the printer, so that the power of expression can be improved.

(8) The data reproduction device according to (7), characterized in that the printer controller (32) has scroll control means (32A) for, if the sub-set identification result of the data identification device (31) indicates sequential data, controlling the scroll of the printing paper in accordance with the course of a change in data.

Namely, it is possible to reproduce sequential data which is difficult to express on the printer. Also, since the course of change is printed, it is possible to observe the data which may be overwritten with the passage of time if it is reproduced on the monitor on a sub-set-by-sub-set basis, thereby facilitating comparison.

(9) The data reproduction device according to (7), characterized in that the printer controller (32) has frame control means (32B) for, if the sub-set identification result of the data identification device (31) indicates moving image data, generating a still image for each frame from the moving image data, and for outputting the still image to the printer (33).

Namely, it is possible to reproduce pseudo-moving images using the afterimage effect by printing respective frames of moving image data, which cannot be expressed by the printer, on sheets of paper.

(10) The data reproduction device according to (7), characterized in that the printer controller (32) has page control means (32B) for, if the sub-set identification result of the data identification device (31) indicates image data exceeding the size which can be expressed on a page of paper, splitting the image data into areas each of which can be printed on a page of paper, and for outputting the split image areas to the printer (33).

Namely, it is possible to reproduce highly fine image data in a multi-screen manner, which can be expressed on a monitor only if the data is reduced in size or can be partially displayed, by splitting the data into areas for respective pages of paper.

(11) The data reproduction device according to (7), characterized in that the printer controller (32) has score reconstruction means (32C) for, if the sub-set identification result of the data identification device (31) indicates MIDI data, expanding the MIDI data to a score, and for outputting the score to the printer (33).

Namely, it is possible to reproduce a MIDI code, which cannot be played by the printer, as a score.

(12) The data reproduction device according to (7), characterized in that the printer controller (32) has voice-to-text construction means (32D) for, if the sub-set identification result of the data identification device (31) indicates voice data, identifying and converting the voice data into a text, and for outputting the text to the printer (33).

Namely, it is possible to reproduce the voice data, which cannot be reproduced by the printer, as a text.

(13) A data output device characterized by comprising:

a printer (33) using a continuous form; and a scroll controller (32A) for, upon receiving sequential still image data, controlling the scroll of the continuous form of the printer in accordance with the course of a change in data.

Namely, it is possible to reproduce sequential data which is difficult to express on the printer. Also, since the course of change is printed with the passage of time, it is possible to observe the sequential data simultaneously, thereby facilitating comparison.

(14) A data output device characterized by comprising:

a printer (33) printing data on a printing paper; and frame control means (32B) for, upon receiving moving image data, generating a still image for each frame from the moving image data, and for outputting the still image to the printer (33).

Namely, it is possible to reproduce pseudo-moving images by using the afterimage effect by printing frames of moving image data on respective sheets of paper.

(15) A data output device characterized by comprising:

a printer (33) printing data on a printing paper; and page control means (32B) for, upon receiving image data exceeding the size which can be printed on a page of the printing paper, splitting the image data into areas each of which can be printed on a page of paper, and for outputting the split image areas to the printer (33).

Namely, it is possible to reproduce highly fine image data in a multi-screen manner, which can be displayed only if the data is reduced in size or can be partly displayed, by printing split image areas on respective pages of paper.

(16) A data output device characterized by comprising:

a printer (33) printing data on a printing paper; and score reconstruction means (32C) for, upon receiving MIDI data, expanding the MIDI data to a score and for outputting the score to the printer (33).

Namely, it is possible to reproduce the MIDI code, which cannot be played by the printer, as a score.

(17) A data output device characterized by comprising:

a printer (33) printing data on a printing paper; and voice-to-text construction means (32D) for, upon receiving voice data, identifying and converting the voice data into a text and for outputting the text to the printer (33).

Namely, it is possible to reproduce voice data, which cannot be reproduced by the printer, as a text.

Additional advantages and modifications will readily occur to those skilled in the art. Therefore, the invention in its broader aspects is not limited to the specific details, and representative devices shown and described herein. Accordingly, various modifica-tions may be made without departing from the spirit or scope of the general inventive concept as defined by the appended claims and their equivalents.

What is claimed is:

1. A data reproduction system comprising:

a reader for optically reading a code with a predetermined format recorded in an optically readable manner on a data recording medium, and for decoding the code for respective sub-sets, multimedia information which includes at least one of voice information, image information and text information being coded, with a pre-determined method, into the data, serving as the codes, in units of sub-sets in said data recording medium, said sub-sets being groups of data each of which can be identified as an information unit; and a data reproduction device for reproducing and outputting the data decoded by said reader, wherein said data reproduction device includes:

a data identification device for identifying contents of data for the respective sub-sets, decoded by said reader;

a printer controller for controlling a printer based on an identification result of said data identification device; and said printer, controlled by said printer controller, for printing out said data.

2. The data reproduction system according to claim 1, wherein said printer controller has scroll control means for, if a sub-set identification result of said data identification device indicates sequential data, controlling a scroll of printer paper in accordance with a course of a change in data.

3. The data reproduction system according to claim 1, wherein said printer controller has frame control means for, if a sub-set identification result of said data identification device indicates moving image data, generating a still image for each frame from said moving image data, and for outputting the still image to said printer.

4. The data reproduction system according to claim 1, wherein said printer controller has page control means for, if a sub-set identification result of the data identification device indicates image data exceeding a size which can be printed on a page of the printing paper, splitting said image data into areas each of which can be printed on a page of the printing paper, and for outputting the split image areas to said printer.

5. The data reproduction system according to claim 1, wherein said printer controller has score reconstruction means for, if a sub-set identification result of the data identification device indicates the MIDI data, expanding MIDI data to a score, and for outputting the score to said printer.

6. The data reproduction system according to claim 1, wherein said printer controller has voice-to-text construction means for, if a sub-set identification result of the data identification device indicates voice data, identifying and converting voice data into a text, and for outputting the text to said printer.

* * * * *